(12) United States Patent
Lair

(10) Patent No.: US 8,052,085 B2
(45) Date of Patent: Nov. 8, 2011

(54) THRUST REVERSER FOR A TURBOFAN GAS TURBINE ENGINE

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 893 days.

(21) Appl. No.: 11/941,378

(22) Filed: Nov. 16, 2007

(65) Prior Publication Data
US 2009/0127390 A1 May 21, 2009

(51) Int. Cl.
*F02K 1/54* (2006.01)
(52) U.S. Cl. ............... 244/110 B; 60/226.2; 239/265.29
(58) Field of Classification Search ............... 244/12.5, 244/23 D, 110 B; 60/226.2, 230; 239/265.25, 239/265.29
See application file for complete search history.

(56) References Cited

U.S. PATENT DOCUMENTS

| | | | |
|---|---|---|---|
| 2,847,823 A | 8/1958 | Brewer | |
| 3,002,342 A * | 10/1961 | Schatzki | 239/127.3 |
| 3,347,578 A | 10/1967 | Sheehan et al. | |
| 3,492,821 A | 2/1970 | Monaghan et al. | |
| 3,541,794 A | 11/1970 | Johnston et al. | |
| 3,550,855 A | 12/1970 | Feld et al. | |
| 3,610,534 A | 10/1971 | Medawar | |
| 3,640,468 A | 2/1972 | Searle et al. | |
| 3,660,982 A | 5/1972 | Gozlan | |
| 3,684,182 A | 8/1972 | Maison | |
| 3,856,239 A | 12/1974 | Leibach | |
| 4,047,381 A | 9/1977 | Smith | |
| 4,129,269 A | 12/1978 | Fage | |
| 4,147,027 A * | 4/1979 | Greathouse | 60/226.2 |
| 4,175,385 A | 11/1979 | Nash | |
| 4,182,501 A | 1/1980 | Fage | |
| 4,212,442 A | 7/1980 | Fage | |
| 4,232,516 A | 11/1980 | Lewis et al. | |
| 4,292,803 A | 10/1981 | Prior | |
| 4,362,015 A | 12/1982 | Fage | |
| 4,422,605 A | 12/1983 | Fage | |
| 4,424,669 A | 1/1984 | Fage | |
| 4,519,561 A | 5/1985 | Timms | |
| 4,581,890 A | 4/1986 | Giraud | |
| 4,682,733 A | 7/1987 | Newton | |
| 4,801,112 A | 1/1989 | Fournier | |
| 4,830,519 A | 5/1989 | Starke | |

(Continued)

FOREIGN PATENT DOCUMENTS

FR  2601077  1/1988

(Continued)

OTHER PUBLICATIONS

U.S. Appl. No. 11/941,360, filed Nov. 16, 2007, entitled "Thrust Reverser Door", by Jean-Pierre Lair.

(Continued)

*Primary Examiner* — Tien Dinh
*Assistant Examiner* — Joseph W Sanderson
(74) *Attorney, Agent, or Firm* — Francis L. Conte

(57) ABSTRACT

The thrust reverser includes, in one aspect, an interior flow deflector which defines a portion of a substantially continuous and uninterrupted nozzle interior surface with the interior of a jet pipe when the door is in a stowed position, thereby reducing aerodynamic losses and improving efficiency. In another aspect, improved sealing arrangement between the jet pipe and the door provides increased performance when the doors are stowed.

26 Claims, 8 Drawing Sheets

U.S. PATENT DOCUMENTS

| | | |
|---|---|---|
| 4,836,451 A | 6/1989 | Herrick et al. |
| 4,860,956 A | 8/1989 | Fage |
| 4,865,256 A | 9/1989 | Durand |
| 4,894,985 A | 1/1990 | Dubois |
| 4,909,346 A | 3/1990 | Torkelson |
| 4,914,905 A | 4/1990 | Dubois |
| 4,916,895 A | 4/1990 | Dubois |
| 4,922,712 A | 5/1990 | Matta |
| 4,922,713 A | 5/1990 | Barbarin |
| 4,960,243 A | 10/1990 | Dubois |
| 4,966,327 A | 10/1990 | Fage et al. |
| 4,976,466 A | 12/1990 | Vauchel |
| 4,998,409 A | 3/1991 | Mutch |
| 5,003,770 A | 4/1991 | Schegerin |
| 5,039,171 A | 8/1991 | Lore |
| 5,040,730 A | 8/1991 | Hogie |
| 5,083,426 A | 1/1992 | Layland |
| 5,090,197 A | 2/1992 | Dubois |
| 5,097,661 A | 3/1992 | Lair et al. |
| 5,101,621 A | 4/1992 | Mutch |
| 5,117,630 A | 6/1992 | Cariola |
| 5,120,004 A | 6/1992 | Matthias |
| 5,167,118 A | 12/1992 | Torkelson |
| 5,176,340 A | 1/1993 | Lair |
| 5,181,676 A | 1/1993 | Lair |
| 5,192,023 A | 3/1993 | Fage et al. |
| 5,197,693 A | 3/1993 | Remlaoui |
| 5,203,525 A | 4/1993 | Remlaoui |
| 5,209,057 A | 5/1993 | Remlaoui |
| 5,211,008 A | 5/1993 | Fage |
| 5,221,048 A | 6/1993 | Lair |
| 5,224,342 A | 7/1993 | Lair |
| 5,228,641 A | 7/1993 | Remlaoui |
| 5,230,213 A | 7/1993 | Lawson |
| 5,243,817 A | 9/1993 | Matthias |
| 5,251,435 A | 10/1993 | Pauley |
| 5,267,438 A | 12/1993 | Bunel |
| 5,284,015 A | 2/1994 | Carimali |
| 5,297,387 A | 3/1994 | Carimali |
| 5,309,711 A | 5/1994 | Matthias |
| 5,310,117 A | 5/1994 | Fage et al. |
| 5,347,808 A | 9/1994 | Standish |
| 5,372,006 A | 12/1994 | Lair |
| 5,390,879 A | 2/1995 | Lair |
| 5,392,991 A | 2/1995 | Gatti |
| 5,396,762 A | 3/1995 | Standish |
| 5,419,515 A | 5/1995 | Lair |
| 5,440,875 A | 8/1995 | Torkelson |
| 5,473,886 A | 12/1995 | Lebrun |
| 5,524,431 A | 6/1996 | Brusson |
| 5,548,954 A | 8/1996 | de Cambray |
| 5,558,594 A | 9/1996 | Lefranc |
| 5,615,549 A | 4/1997 | Valleroy |
| 5,615,834 A | 4/1997 | Osman |
| 5,655,360 A | 8/1997 | Butler |
| 5,666,802 A | 9/1997 | Lair |
| 5,671,598 A | 9/1997 | Standish |
| 5,716,025 A | 2/1998 | Meyer |
| 5,720,449 A | 2/1998 | Laboure |
| 5,725,182 A | 3/1998 | Valleroy |
| 5,727,380 A | 3/1998 | Lardy et al. |
| 5,730,392 A | 3/1998 | Lair |
| 5,765,362 A | 6/1998 | Gonidec |
| 5,775,097 A | 7/1998 | Lardy |
| 5,775,639 A | 7/1998 | Fage |
| 5,778,659 A | 7/1998 | Duesler |
| 5,778,660 A | 7/1998 | Jean |
| 5,779,192 A | 7/1998 | Metezeau et al. |
| 5,782,434 A | 7/1998 | Jean |
| 5,785,249 A | 7/1998 | Metezeau |
| 5,794,433 A | 8/1998 | Peters |
| 5,799,903 A | 9/1998 | Vauchel |
| 5,806,302 A | 9/1998 | Cariola |
| 5,813,220 A | 9/1998 | Portal |
| 5,819,527 A | 10/1998 | Fournier |
| 5,819,528 A | 10/1998 | Masson |
| 5,826,823 A | 10/1998 | Lymons |
| 5,836,149 A | 11/1998 | Servanty |
| 5,852,928 A | 12/1998 | Vauchel |
| 5,853,148 A | 12/1998 | Standish |
| 5,863,014 A | 1/1999 | Standish |
| 5,875,995 A | 3/1999 | Moe |
| 5,893,265 A | 4/1999 | Gonidec |
| 5,899,059 A | 5/1999 | Gonidec |
| 5,904,041 A | 5/1999 | Dhainault |
| 5,913,476 A | 6/1999 | Gonidec |
| 5,927,647 A | 7/1999 | Masters |
| 5,930,991 A | 8/1999 | Fournier |
| 5,934,613 A | 8/1999 | Standish |
| 5,937,636 A | 8/1999 | Gonidec |
| 5,947,625 A | 9/1999 | Vauchel |
| 5,956,939 A | 9/1999 | Fage |
| 5,960,626 A | 10/1999 | Baudu |
| 5,967,460 A | 10/1999 | Baudu |
| 5,970,704 A | 10/1999 | Lardy |
| 5,974,783 A | 11/1999 | Gonidec |
| 5,983,625 A | 11/1999 | Gonidec |
| 5,987,881 A | 11/1999 | Gonidec |
| 5,996,937 A | 12/1999 | Gonidec |
| 5,997,054 A | 12/1999 | Baudu |
| 6,000,216 A | 12/1999 | Vauchel |
| 6,009,702 A | 1/2000 | Gonidec |
| 6,026,638 A | 2/2000 | Gonidec |
| 6,027,071 A | 2/2000 | Lair |
| 6,029,439 A | 2/2000 | Gonidec |
| 6,032,901 A | 3/2000 | Carimali |
| 6,044,641 A | 4/2000 | Baudu |
| 6,045,091 A | 4/2000 | Baudu |
| 6,065,285 A | 5/2000 | Gonidec |
| 6,068,213 A | 5/2000 | Gonidec |
| 6,076,347 A | 6/2000 | Gonidec |
| 6,079,201 A | 6/2000 | Jean |
| 6,082,096 A | 7/2000 | Vauchel |
| 6,094,908 A | 8/2000 | Baudu |
| 6,101,807 A | 8/2000 | Gonidec |
| 6,105,439 A | 8/2000 | Roger |
| 6,145,301 A | 11/2000 | Gonidec |
| 6,145,786 A | 11/2000 | Baudu |
| 6,148,607 A | 11/2000 | Baudu |
| 6,151,884 A | 11/2000 | Gonidec |
| 6,151,885 A | 11/2000 | Metezeau |
| 6,151,886 A | 11/2000 | Vauchel |
| 6,158,211 A | 12/2000 | Gonidec |
| 6,170,254 B1 | 1/2001 | Cariola |
| 6,170,255 B1 | 1/2001 | Gonidec |
| 6,173,807 B1 | 1/2001 | Welch et al. |
| 6,216,980 B1 | 4/2001 | Baudu |
| 6,237,325 B1 | 5/2001 | Hogie |
| 6,256,979 B1 | 7/2001 | Fournier |
| 6,260,801 B1 | 7/2001 | Peters |
| 6,276,026 B1 | 8/2001 | Wille |
| 6,293,495 B1 | 9/2001 | Aten |
| 6,357,672 B1 | 3/2002 | Cowan et al. |
| 6,385,964 B2 | 5/2002 | Jean |
| 6,402,092 B1 | 6/2002 | Jean |
| 6,438,942 B2 | 8/2002 | Fournier |
| 6,487,845 B1 | 12/2002 | Modglin |
| 6,546,715 B1 | 4/2003 | Blevins |
| 6,546,716 B2 | 4/2003 | Lair |
| 6,568,172 B2 | 5/2003 | Jannetta et al. |
| 6,584,763 B2 | 7/2003 | Lymons |
| 6,592,074 B2 | 7/2003 | Dehu |
| 6,622,964 B2 | 9/2003 | Rouyer |
| 6,688,098 B2 | 2/2004 | Rouyer |
| 6,688,099 B2 | 2/2004 | Lair |
| 6,751,944 B2 | 6/2004 | Lair |
| 6,786,038 B2 | 9/2004 | Lair |
| 6,804,947 B2 | 10/2004 | Le Docte |
| 6,820,410 B2 | 11/2004 | Lair |
| 6,845,607 B2 | 1/2005 | Lair |
| 6,845,946 B2 | 1/2005 | Lair |
| 6,895,742 B2 | 5/2005 | Lair et al. |
| 6,910,328 B1 | 6/2005 | Joyce |
| 6,926,234 B2 | 8/2005 | Colotte |
| 6,938,408 B2 | 9/2005 | Lair |
| 6,945,031 B2 | 9/2005 | Lair |
| 6,966,175 B2 | 11/2005 | Lair |

| | | |
|---|---|---|
| 6,968,675 B2 | 11/2005 | Ramlaoui et al. |
| 6,971,229 B2 | 12/2005 | Lair |
| 6,976,352 B2 | 12/2005 | Lair |
| 6,983,588 B2 | 1/2006 | Lair |
| 6,993,819 B2 | 2/2006 | Homann |
| 7,007,454 B2 | 3/2006 | Dehu |
| 7,010,905 B2 | 3/2006 | Lair |
| 7,043,897 B2 | 5/2006 | Osman |
| 7,055,329 B2 | 6/2006 | Martens et al. |
| 7,093,793 B2 | 8/2006 | Lair |
| 7,127,880 B2 | 10/2006 | Lair |
| 7,146,796 B2 | 12/2006 | Lair |
| 7,229,247 B2 | 6/2007 | Durocher et al. |
| 7,255,307 B2 | 8/2007 | Mayes |
| RE39,972 E | 1/2008 | Royalty |
| 2004/0139726 A1 | 7/2004 | Colotte |
| 2005/0151012 A1 | 7/2005 | Lair |
| 2005/0183894 A1 | 8/2005 | Lair |
| 2006/0005530 A1 | 1/2006 | Blin |
| 2006/0288688 A1 | 12/2006 | Lair |
| 2008/0072570 A1 | 3/2008 | Lair |

FOREIGN PATENT DOCUMENTS

| | | |
|---|---|---|
| WO | 86/00862 A1 | 2/1986 |
| WO | WO 9855754 A1 * | 12/1998 |

OTHER PUBLICATIONS

U.S. Appl. No. 11/941,371, filed Nov. 16, 2007, entitled "Pivoting Door Thrust Reverser for a Turbofan Gas Turbine Engine", by Jean-Pierre Lair.

U.S. Appl. No. 11/941,395, filed Nov. 16, 2007, entitled "Pivoting Fairings for a Thrust Reverser", by Jean-Pierre Lair.

U.S. Appl. No. 11/941,391, filed Nov. 16, 2007, entitled "Thrust Reverser Door", by Jean-Pierre Lair.

U.S. Appl. No. 11/941,388, filed Nov. 16, 2007, entitled "Thrust Reverser", by Jean-Pierre Lair.

U.S. Appl. No. 12/142,084, filed Jun. 19, 2008, entitled "Thrust Reverser for a Turbofan Gas Turbine Engine", by Jean-Pierre Lair and Paul Weaver.

* cited by examiner

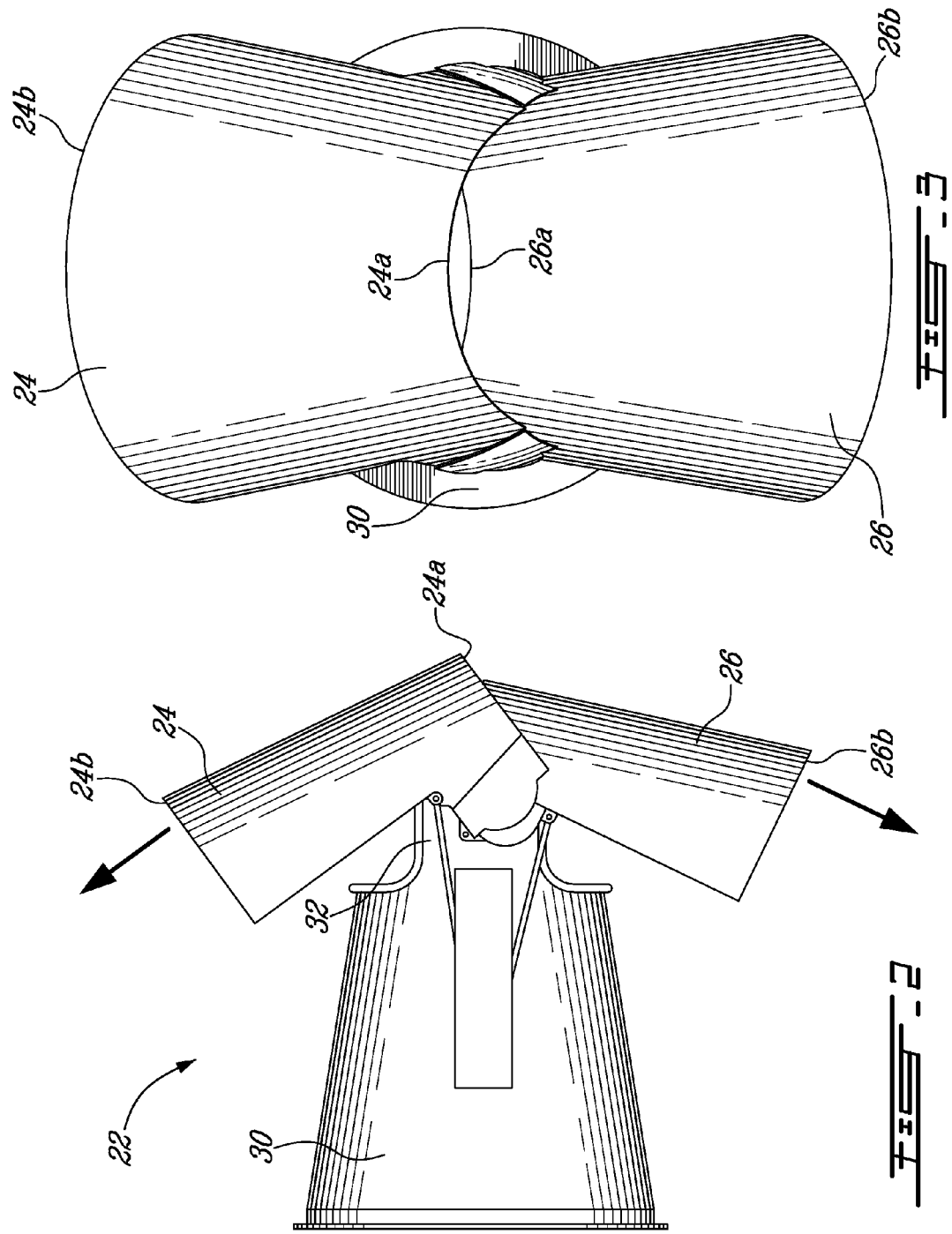

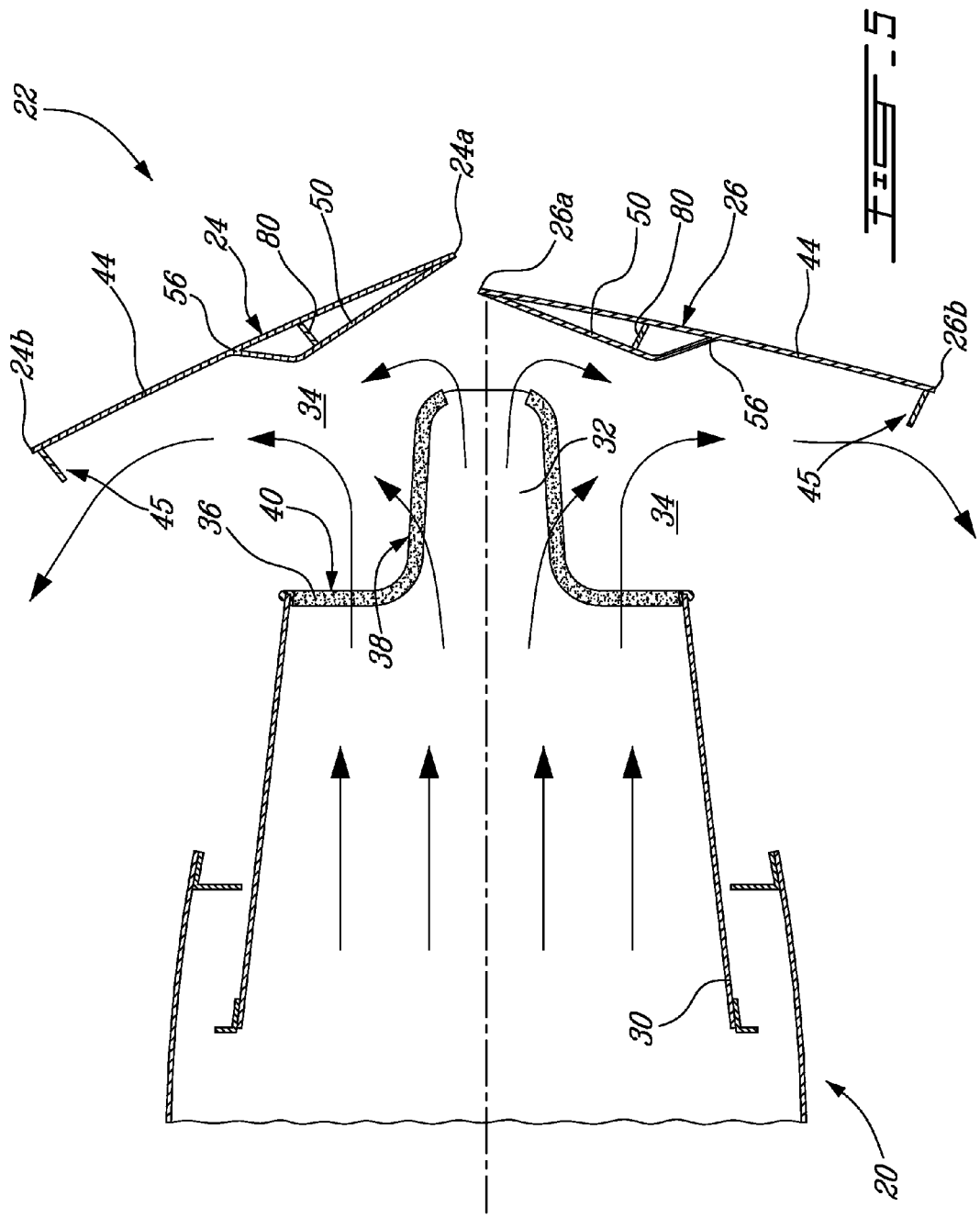

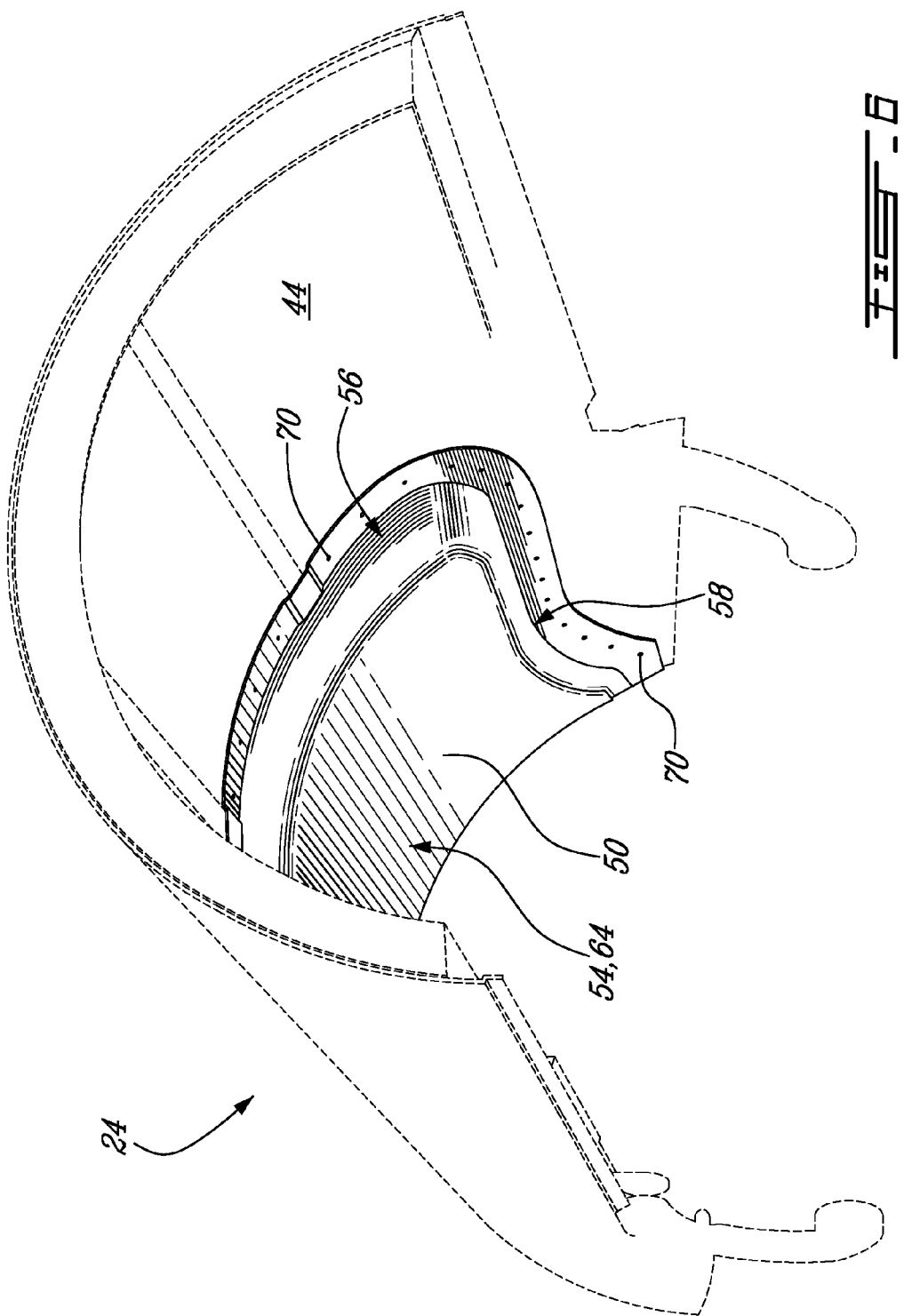

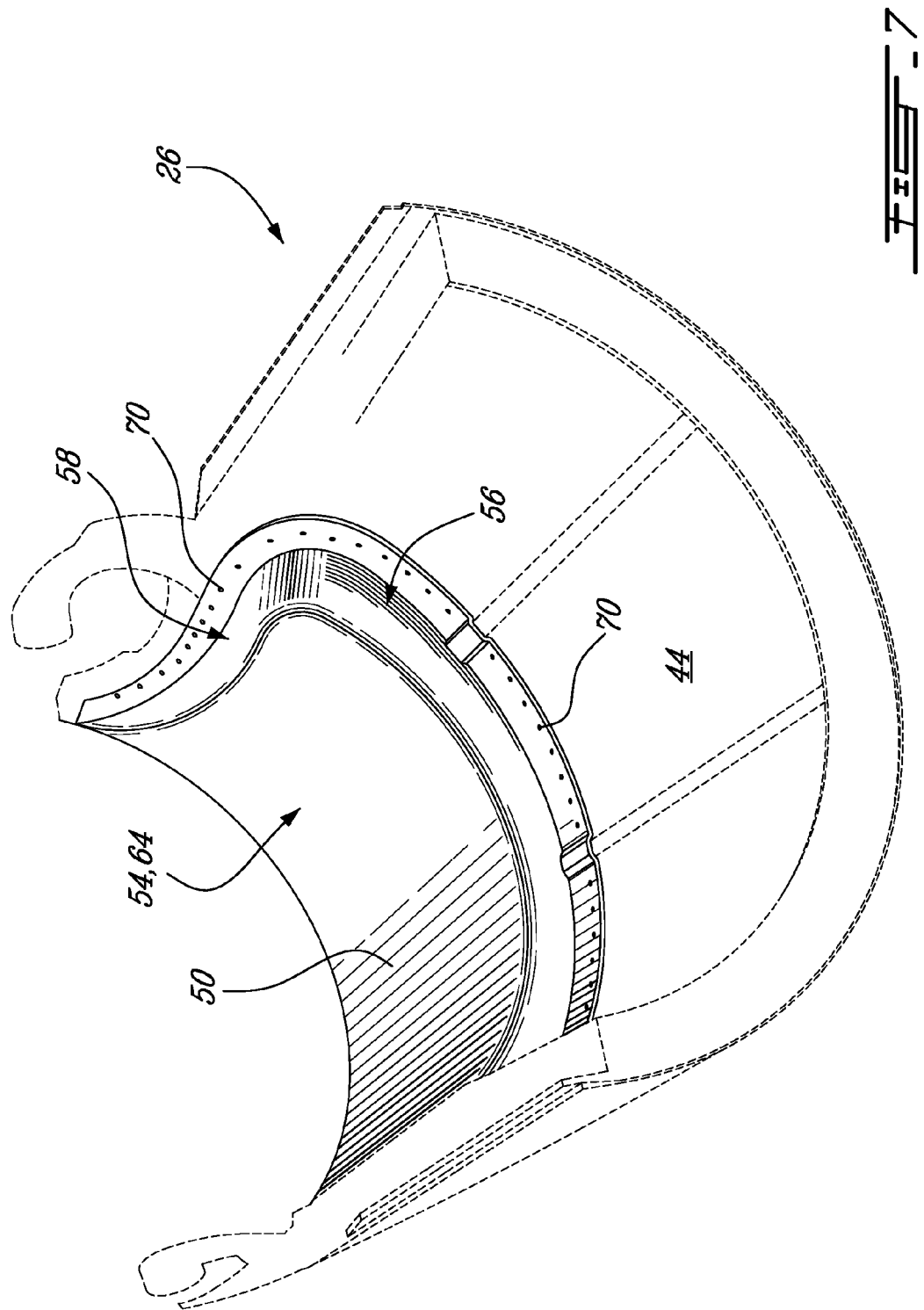

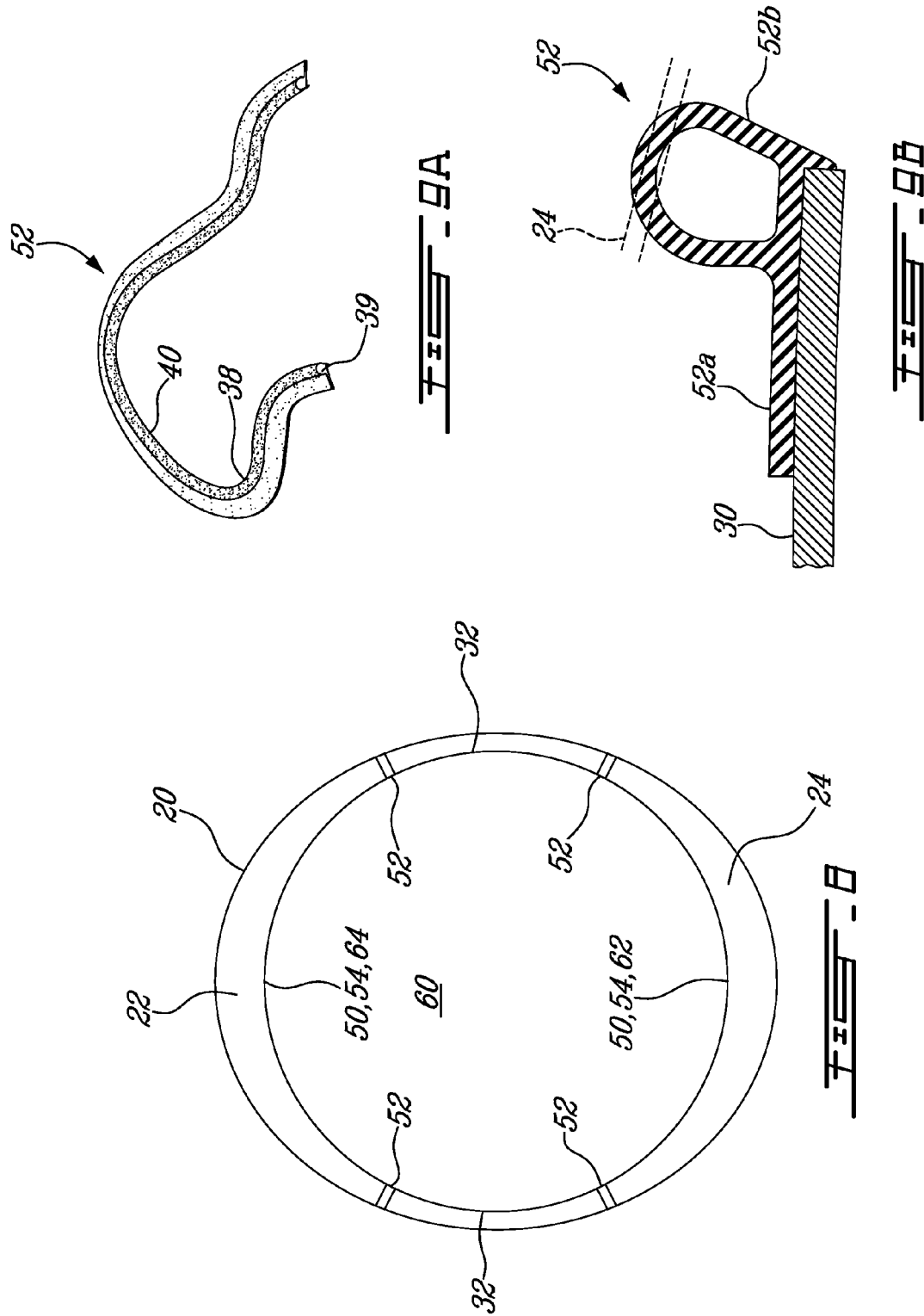

US 8,052,085 B2

THRUST REVERSER FOR A TURBOFAN GAS TURBINE ENGINE

TECHNICAL FIELD

The invention relates to thrust reversers for turbofan gas turbine engines.

BACKGROUND

Thrust reversers on gas turbine engines have to fulfill two functions: while stowed, to provide an exhaust nozzle for the direct thrust generated by the engine; and while deployed, to redirect the engine thrust to order to provide a decelerating force after landing. Since almost the entire flight sequence occurs with the thrust reverser in the stowed position, it is desirable that the presence of the thrust reverser does not degrade the direct thrust performance of the engine.

While many thrust reversers models have been used successfully for a number of years, there is a need to provide an improved arrangement.

SUMMARY

In one aspect, the present concept provides a thrust reverser for a turbofan engine, the thrust reverser comprising at least first and second doors pivotally connected to a jet pipe, the jet pipe having an exit defined by an exit profile, each door having an outer skin and an inner skin mounted to the outer skin, the inner skin extending along only a portion of an axial length of the outer skin, the inner skin of the doors having edges that matingly engage the edges of the jet pipe substantially along the length of the exit profile.

In another aspect, the present concept provides a thrust reverser comprising: a jet pipe having an inner flow surface for receiving engine exhaust gases, the jet pipe having a circular portion and two arms extending rearward of the circular portion; and a pair of opposed doors pivotally connected to the jet pipe arms, each door having an inner flow surface in registry with the inner flow surface of the jet pipe and mating therewith to engage the jet pipe along its exit length when the doors are closed, wherein the inner surface of the jet pipe and the inner surfaces of the doors co-operate to provide a nozzle for engine exhaust gases.

In another aspect, the present concept provides a thrust reverser for a turbofan engine, the thrust reverser comprising an interior wall defining a continuous nozzle interior surface from a nozzle inlet to a thrust reverser exit when the doors are in a stowed position, the nozzle interior surface co-operatively defined by an internal surface of a jet pipe of the thrust reverser, internal surfaces of a plurality of closed thrust reverser doors of the thrust reverser, and seals extending between the jet pipe and each door substantially along an interface between the jet pipe and said door.

Further details of these and other aspects of the improvements presented herein will be apparent from the detailed description and appended figures.

BRIEF DESCRIPTION OF THE FIGURES

FIG. 2 is a schematic side view of the thrust reverser of FIG. 1, with doors shown in a deployed position;

FIG. 3 is a rear view of what is shown in FIG. 2;

FIG. 5 is a view similar to FIG. 4, showing the doors in a deployed position;

FIG. 6 is an isometric view showing an example of an improved upper door;

FIG. 7 is an isometric view showing an example of an improved lower door;

FIG. 8 is a cross-section through lines 8-8 of FIG. 1;

FIG. 9A is an isometric view of the upper seal shown in FIG. 4 and FIG. 9B is an enlarged cross section of an example of the seal mounted to the jet pipe.

DETAILED DESCRIPTION

Figure 1:
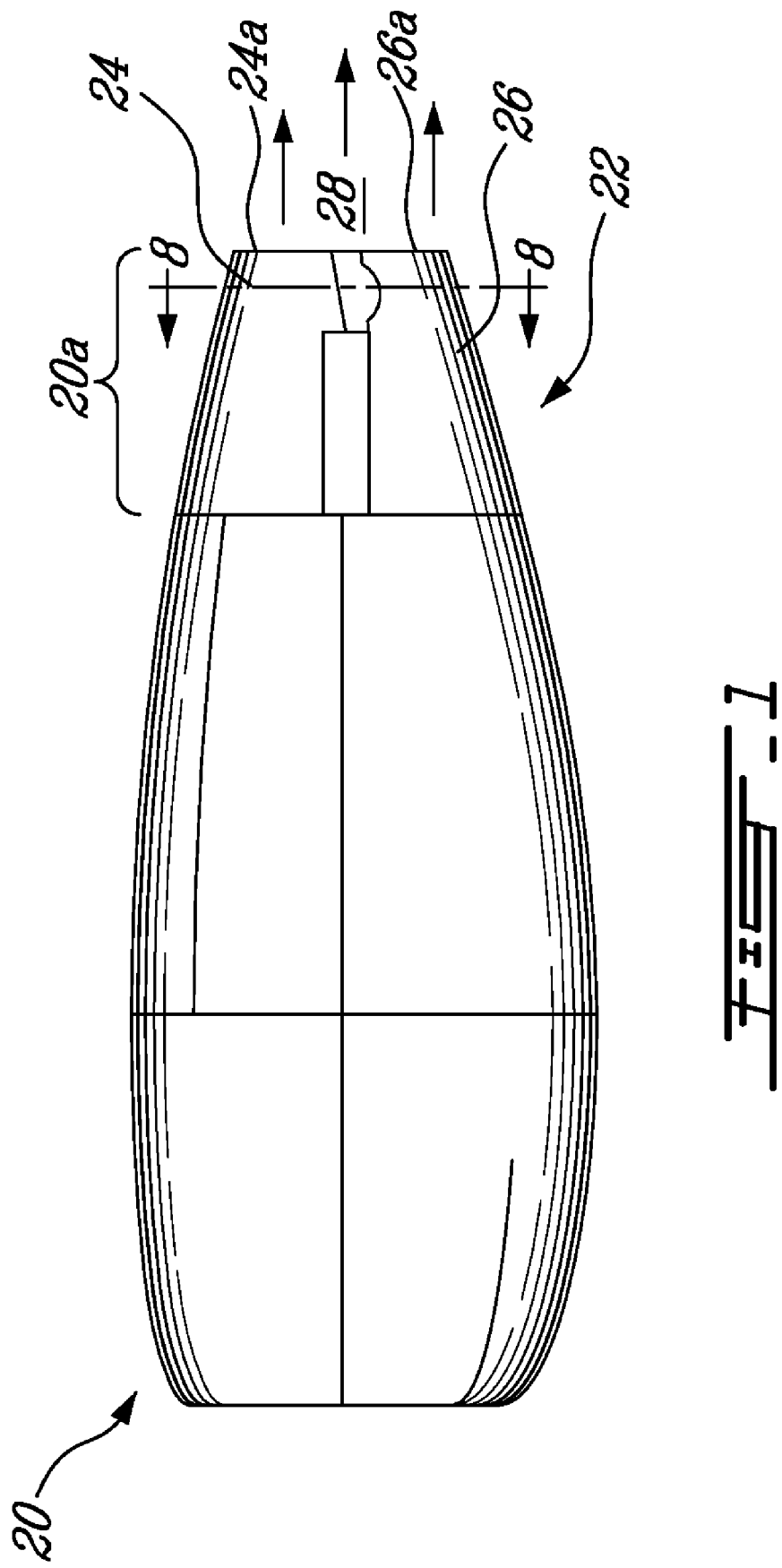
FIG. 1 is a side view of an example of a nacelle provided with a thrust reverser according to the present arrangement, its doors being shown in a stowed position.

Referring now to FIG. 1, there is shown an example of a nacelle 20 including a thrust reverser 22 of the target/bucket type, located in the aft section 20a of the nacelle 20. The turbofan gas turbine engine is located within the nacelle 20 and the engine and nacelle 20 are attached under the wings, or to the fuselage, of the aircraft using an appropriate arrangement (not shown).

The thrust reverser 22 comprises two opposite pivoting doors 24, 26 forming an exhaust exit nozzle of the nacelle 20, having a planar exit 28, when the doors are in their stowed position. One door 24 is at the upper side and the other door 26 is at the lower side.

Each door 24, 26 has a trailing edge 24a, 26a defining a portion of the exit 28. The arrows in FIG. 1 represent the direct thrust air flow generated by operation of the engine.

FIG. 2 is an enlarged view of only the thrust reverser of FIG. 1, showing a jet pipe 30 to which doors 24, 26 are pivotally connected.

FIG. 3 is a rear view of what is shown in FIG. 2. The doors 24, 26 are in their deployed position in FIGS. 2 and 3. The jet pipe 30 is concealed inside the aft section 20a of the nacelle 20 when the doors 24, 26 are in their stowed position, as in FIG. 1.

Figure 4:
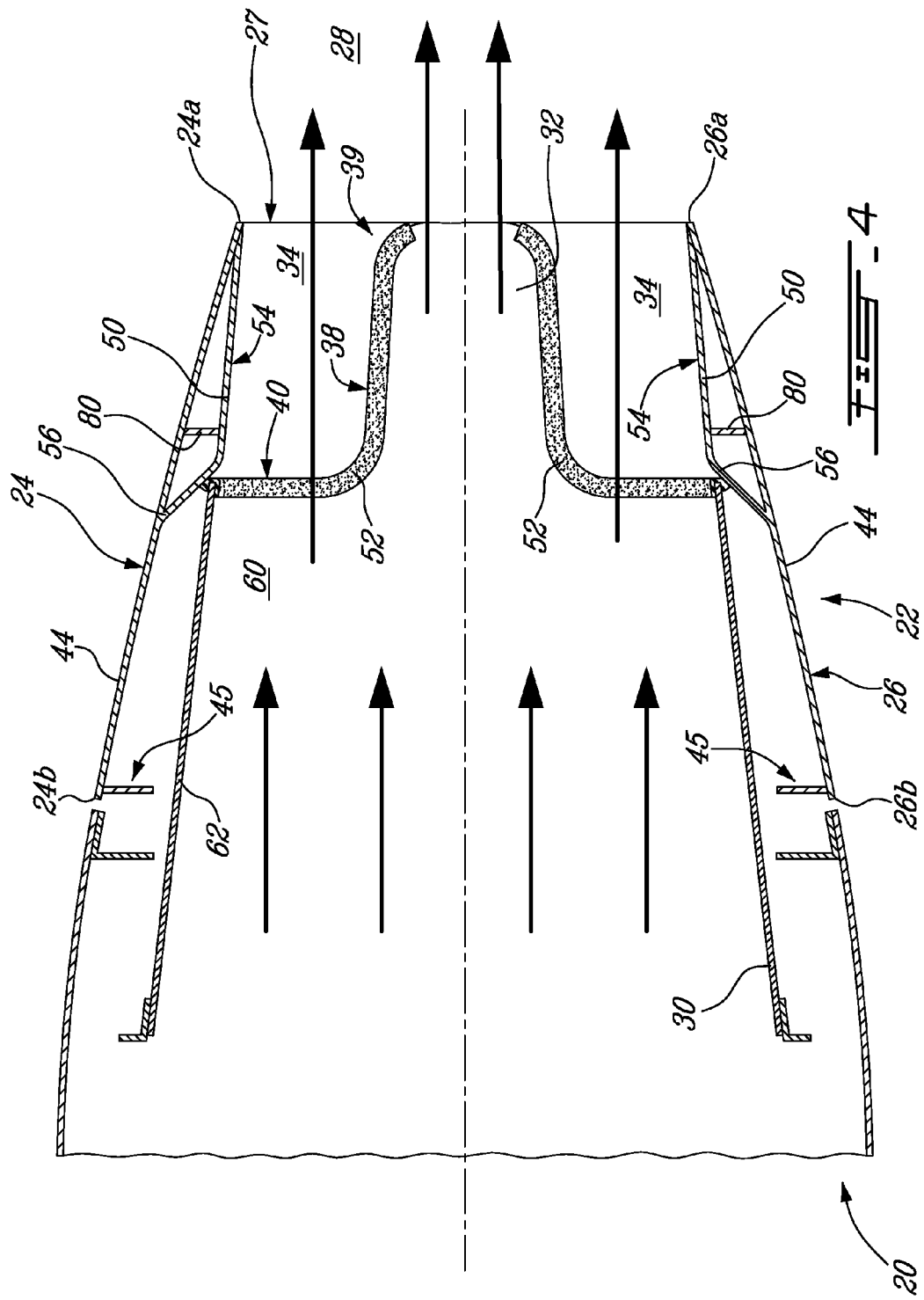
FIG. 4 is a schematic longitudinal cross-sectional view showing an example of the improved arrangement with the thrust reverser doors in the stowed position.

As shown in FIG. 4, the jet pipe 30 has axially-downstream-extending arms 32 on either side of upper and lower cutouts 34, with peripheral edges defining the cutouts 34, each edge having substantially horizontal or longitudinal portion 38 and a generally vertical or circumferential portion 40 (which the reader will appreciate is semi-circular in shape, extending from the substantially horizontal portion 38 on one side or arm of the jet pipe 30, to the substantially horizontal portion 38 on the other side or arm of the jet pipe 30). Peripheral edges preferably include a seal 52 along the lengths of portions 38 and 40, as will be described further below.

The arrows in FIG. 2 indicate the main exhaust gas flow path during thrust reversal. Exhaust gases coming out of the engine are redirected substantially forwardly when the doors 24, 26 are in their deployed position.

The gases exit the doors 24, 26 in the vicinity of their leading edges 24b, 26b. The leading edges 24b, 26b are located at the front of the doors 24, 26, and hence are ?leading? edges with reference to the travel path of the aircraft.

The redirection of the gases coming out of the engine creates a horizontal retarding force opposing the forward movement of the aircraft. Increasing the output thrust generated by the engine increases the aerodynamic decelerating force.

In the illustrated example, the trailing edge 24a of the upper door 24 is pivoted behind the trailing edge 26a of the lower door 26, this resulting from the asymmetrical positioning of the pivots with reference to the horizontal medial plane of the jet pipe 30, as described in applicant's co-pending application Ser. No. 11/534,202, filed Sep. 21, 2006.

It should be noted that, although the doors 24, 26 are described herein and shown in the figures as an upper reverser door 24 and a lower reverser door 26 movable in a vertical plane, the doors may instead be configured with any other suitable orientation, such as a left door and right door movable in a horizontal plane. Other suitable arrangements are possible, as well, within the teachings of the present concepts.

FIG. 4 schematically shows a longitudinal cross section of the thrust reverser of FIG. 1, and shows an example of the thrust reverser with doors 24, 26 in a stowed position, adjacent the jet pipe 30, such as is the case during direct thrust generation through operation of the engine.

Each door 24, 26 has an outer skin or wall 44 extending from the leading edge 24b, 26b to the trailing edge 24a, 26a thereof. An inwardly extending rib(s) 45 (only one is shown) is provided adjacent the leading edge 24b, 26b, for strength and stiffness, and similar ribs extend along the sides of the door (not shown).

On the interior side of outer skin 44, each door 24, 26 has an inner skin, configured to provide a flow deflector 50 as will be described further below, mounted to the aft portion of the outer skin or wall 44. Each flow deflector 50 has an axial or longitudinal length that is preferably less than the length of the outer skin of wall 44 of the corresponding door 24, 26.

Each flow deflector 50 is defined by a leading edge 56 and lateral edges 58 (see FIGS. 6 and 7) that preferably matingly correspond to the shape of the cutouts 34 of the jet pipe 30, as will be described further below, to provide a substantially continuous exit nozzle 60 when doors 24, 26 are stowed, as shown in FIG. 4.

Each flow deflector 50 is preferably shaped and configured to create a substantially uniform interior flow surface, sometimes referred to as an inner mold line (IML), for exit nozzle 60 when the doors 24, 26 are in their stowed position. The nozzle 60 is preferably defined by surface 62 on the inside of jet pipe 30 and arm 32, and surfaces 64 (FIG. 6) provided by deflectors 50.

In this case, where the jet pipe 30 and deflectors 50 have interior flow lines which provide a fully-convergent (e.g. such as frustoconical) nozzle 60, the flow deflectors 50 preferably have an inner surface 54 shaped and configured to continue the interior flow lines of jet pipe 30 in a fully-convergent fashion.

That is, the flow deflectors 50 complete the interior flow lines otherwise interrupted by the cutout portions 34 of the jet pipe 30, and thus the surfaces 64 of the flow deflectors 50 create a substantially continuous and uninterrupted surface with the interior surface 62 of the jet pipe 30.

As can be seen, in this example each flow deflector 50 extends forwardly from its trailing edge 24a, 26a to about the axial midpoint of its door 24, 26. This leaves the front or leading portion of each door 24, 26 with a single layer skin or wall 44, and results in a construction for the doors 24, 26 which is lighter than a double skin construction.

The outer and inner skins may be sheet metal, cast, machined from solid, or made by other suitable technique. The inner skin/flow deflector 50 can be a single piece or multiple pieces joined together.

The deflectors 50 can be attached to skin 44 by rivets 70 (see FIGS. 6 and 7) or otherwise suitably fastened to the wall 44 of the doors 24, 26. Reinforcing radial frames(s) 80 (only one is shown per door in FIGS. 4 and 5) or other suitable structural reinforcement is preferably provided under flow deflectors 50, if required or desired, for example to stiffen skin 44 or structurally support flow deflector 50.

Referring to FIG. 8, shown is a schematic lateral cross-section of the thrust reverser, taken generally along the lines 8-8 in FIG. 1 (door hinges, actuators, etc. are omitted, for clarity). As can be seen, a substantially continuous nozzle surface 62 is provided, through the co-operation of flow deflectors 50 and jet pipe 30 and arms 32 of jet pipe 30.

In use, when the doors 24, 26 are stowed, the flow deflectors 50 preferably matingly engage the jet pipe 30 substantially all along the peripheral edges. The edges are provided with a preferably continuous peripheral seal 52 preferably substantially along the entire length of the peripheral edges, i.e. along portions 38 and 40. The peripheral seals 52 are preferably of the resilient type and are compressed substantially along their entire lengths when the doors are stowed.

In this example, the seal 52 is engaged and compressed by the leading edges 56 and lateral edges 58 of the flow deflectors 50 when the doors are stowed, to provide a complete sealing substantially around flow deflectors 50, and thus impeding engine exhaust gases from leaking past the seals 52 during the direct thrust operation (i.e. doors stowed).

This has beneficial implications for powerplant efficiency because there are reduced aerodynamic losses within the nozzle 60. To facilitate sealing in this example, leading edges 56 and lateral edges 58 are preferably smooth and contiguous, so that seal 52 is continuously sealingly engaged by the edges 56, 58, when the doors are stowed.

As described above, the peripheral seals 52 extend substantially along the longitudinal portion 38, i.e. along the edges of the extending jet pipe arms 32, and along the substantially circumferential portion 40, along the edges of the jet pipe cutouts 34. The seals 52 are the same length on the upper and lower sides of the jet pipe 30 when the jet pipe cutouts are symmetrical, as shown in FIGS. 4 and 5.

Figure 10:
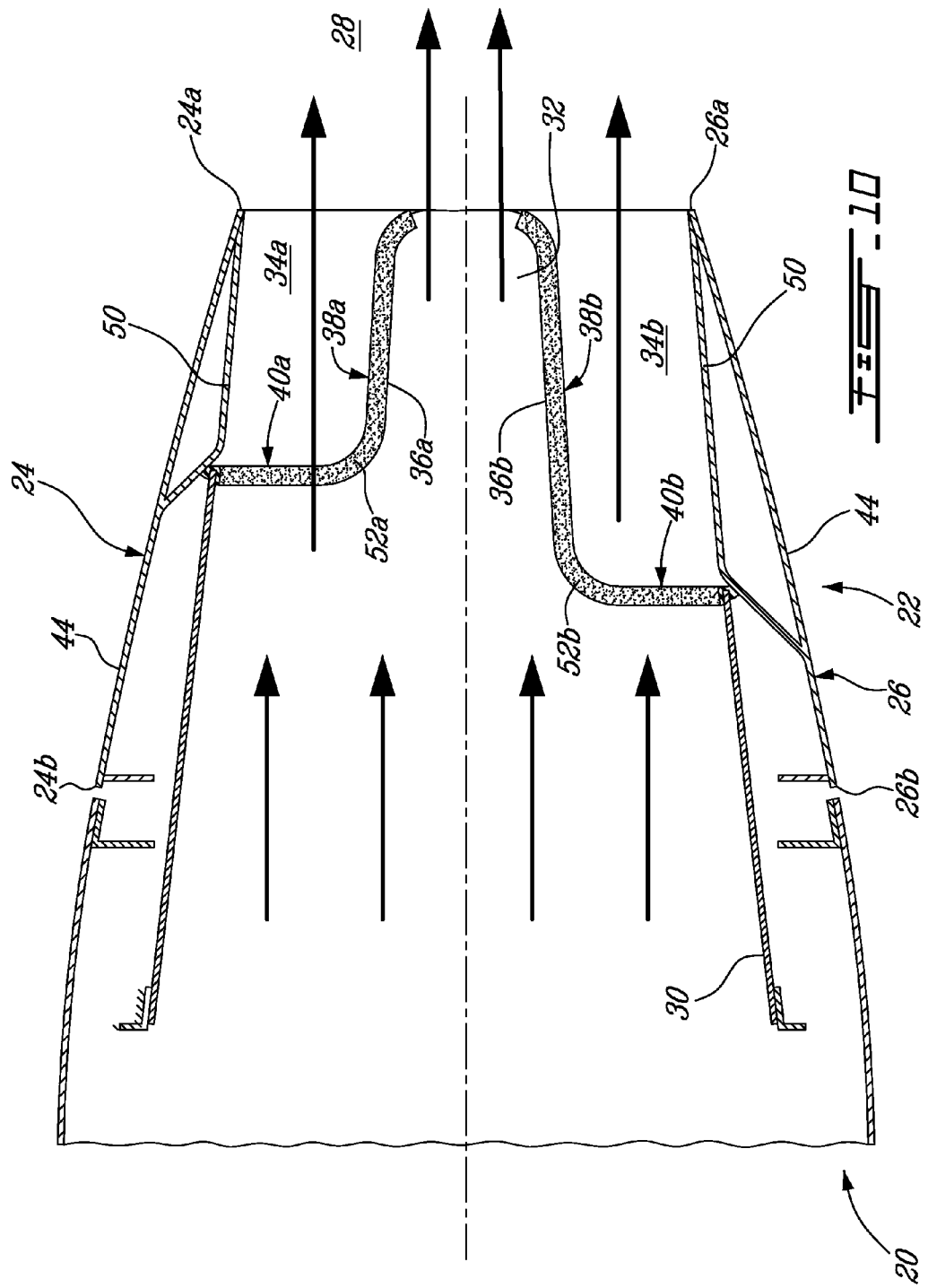
FIG. 10 is a view similar to FIG. 4, showing another embodiment of the improved arrangement.

Referring to FIG. 10, showing another embodiment, lower cutout 34b is larger than upper cutout 34a, and with this arrangement, the seal 52b is necessarily longer than seal 52a, since the perimeter of cutout 34b is longer than that of cutout 34a, as the reader will appreciate. The asymmetrical cutout of the jet pipe shown in FIG. 10 is meant to provide substantially the same efflux exit effective area for the top and the lower reverser doors when said doors 24, 26 are in their deployed position.

FIG. 5 shows the example thrust reverser of FIG. 3 with the doors 24, 26 in a deployed position. As can be seen, gases flowing out through the jet pipe 30 are deflected by the doors 24, 26 toward the front of the aircraft. It also shows that the front or leading edge 56 of the deflectors 50 is inclined to more smoothly blend to the inner surface of the skin/wall 44. Other shapes, configuration and arrangements are possible for cutouts 34 and flow deflectors 50. The reverse efflux preferably does not impinge the seals.

FIGS. 6 and 7 show isometric views of the example thrust reverser doors 24, 26 of FIGS. 2 to 5, each door being provided with a flow deflector 50. FIG. 6 shows the upper door 24 and FIG. 7 shows the lower door 26.

FIG. 9A shows an isometric view of the shape of upper seal 52 when installed on peripheral edge. As can be seen in this figure, and in FIGS. 6 and 7, the shape of the seal 52 and peripheral edge, and the shape of deflector 50, matingly engage along a three-dimensional interface defined between them. Longitudinal portion 38 has a slight curved portion 39 in the region of the door hinges, to facilitate sealing in this area.

FIG. 9B shows an example seal 52, having a mounting portion 52a suitably mounted (e.g. by bonding, riveting with the addition of a seal retainer (not shown) etc.) to jet pipe 30, and a resilient sealing portion 52b which is engaged and compressed by door 24 (in this case) when the door is closed (depicted by broken lines).

As can be appreciated, the arrangement described herein provides a way to seal the interface between doors 24, 26 and jet pipe 30, when the doors are in a stowed position, to eliminate cavities and provide a continuous aerodynamic nozzle surface for exhaust gases exiting the engine through the thrust reverser.

These cavities may otherwise generate turbulence or other aerodynamic losses, thus decrease the overall efficiency of the thrust reverser nozzle during the direct thrust operation of the engine.

Using substantially continuous peripheral seals, preferably along the entire length of edges 52, between the jet pipe arms 32, cutouts 34 and the doors 24, 26, is therefore an improvement to reverser efficiency when stowed.

As mentioned, the seal is preferably compressed all along its length, preferably at a substantial constant compression sufficient to provide effective sealing in view of the pressure drop across the sealed interface and temperature of the exhaust gases. The seal 52 may be provided in any material(s) and configuration(s) suitable to provide the sealing taught herein.

The above description is meant to be exemplary only, and one skilled in the art will recognize that changes may be made to the embodiments described without departing from the spirit of the invention disclosed.

For instance, the shapes and the configuration of the doors may differ from what are shown and described. Although the reverser nozzle described is fully convergent when the reverser doors are stowed, the flow lines (IML) of the nozzle could be any suitable design, such as convergent-divergent, if desired.

The shape and the configuration of the deflectors may also differ from what is shown and described without departing from the concepts taught. Any surface(s) of the deflector may be used to engage the surface to be sealed.

It should be noted that the flow deflectors 50 of the two doors 24, 26 do not need to be identical, as for example is shown in FIG. 10. As mentioned, the present approach is not limited to a particular seal composition or configuration.

Still other modifications will be apparent to those skilled in the art, in light of a review of this disclosure, and such modifications are intended to fall within the scope of the appended claims.

What is claimed is:

1. A thrust reverser for a turbofan engine, the thrust reverser comprising at least first and second doors pivotally connected to a jet pipe, the jet pipe having a side exit defined by an exit cutout profile disposed between two side arms, each door having an outer skin and an inner skin mounted to the outer skin and extending continuously aft to terminate aft with said side arms in a planar exhaust exit when said doors are stowed closed, the inner skin extending along only a portion of an axial length of the outer skin, the inner skin of the doors having edges that matingly engage the edges of the jet pipe substantially along the length of the exit cutout profile to cover said side exit when said doors are stowed closed.

2. The thrust reverser as defined in claim 1, wherein the inner skin defines at least a portion of an exhaust gas nozzle of the thrust reverser terminating aft at said planar exhaust exit.

3. The thrust reverser as defined in claim 2, wherein said jet pipe and doors co-operate to define said nozzle, and wherein said nozzle is fully convergent from entry to exit at said planar exhaust exit.

4. The thrust reverser as defined in claim 1, wherein the inner skin is mounted to a rear portion of the outer skin.

5. The thrust reverser as defined in claim 4, wherein the inner skin extends from a trailing edge of the outer skin to substantially midway between the trailing edge and an outer skin leading edge.

6. The thrust reverser as defined in claim 1, wherein a seal extends between the inner skin edges and the jet pipe edges when the doors are closed, and wherein the seal defines a portion of an exhaust gas nozzle of the thrust reverser.

7. The thrust reverser as defined in claim 6, wherein each seal is a one-piece continuous seal.

8. A thrust reverser comprising:
a jet pipe having an inner flow surface for receiving engine exhaust gases, the jet pipe having a circular portion and two arms extending rearward of the circular portion; and a pair of opposed doors pivotally connected to the jet pipe arms and extending continuously aft with said arms to terminate aft with said arms in a planar exhaust exit when said doors are stowed closed, each door having an inner flow surface in registry with the inner flow surface of the jet pipe and mating therewith to engage the jet pipe along its exit length when the doors are stowed closed, wherein the inner surface of the jet pipe and the inner surfaces of the doors co-operate to provide a nozzle for engine exhaust gases terminating at said planar exhaust exit.

9. The thrust reverser as defined in claim 8, wherein the nozzle is fully-convergent.

10. The thrust reverser as defined in claim 8, wherein the inner flow surface of each door includes a flow deflector connected to a rear portion of the door.

11. The thrust reverser as defined in claim 10, wherein each flow deflector is provided at a rear half of the door.

12. The thrust reverser as defined in claim 11, wherein the door at a front half of each door has a single skin.

13. The thrust reverser as defined in claim 12, wherein each flow deflector has an inclined front section merging with the door.

14. The thrust reverser as defined in claim 13, further comprising a seal extending substantially between the inner flow surface of the jet pipe and the inner surface of each of the doors when the doors are in the stowed position.

15. The thrust reverser as defined in claim 14, wherein the seal defines a portion of said nozzle.

16. The thrust reverser as defined in claim 15, wherein each seal is a one-piece continuous seal.

17. A thrust reverser for a turbofan engine, the thrust reverser comprising a plurality of thrust reverser doors covering corresponding cutouts disposed circumferentially between side arms and extending continuously aft with said side arms to terminate aft with said side arms in a planar thrust reverser exit, and an interior wall defining a continuous nozzle interior surface from a nozzle inlet to said thrust reverser exit when the doors are in a stowed position, the nozzle interior surface co-operatively defined by an internal surface of a jet pipe of the thrust reverser, internal surfaces of said thrust reverser doors when stowed closed, and seals extending between the jet pipe and each door substantially along an interface between the jet pipe and said door.

18. The thrust reverser as defined in claim 17, wherein the nozzle is fully convergent along its length when the doors are stowed.

19. The thrust reverser as defined in claim 17, wherein each seal is a single piece.

20. The thrust reverser as defined in claim 17, wherein each seal is mounted to the jet pipe and is compressed by the associated door when the door is closed.

21. The thrust reverser as defined in claim 17, wherein each seal is compressed along its length when the associated door is closed.

22. A turbofan thrust reverser comprising:

a jet pipe terminating aft in a pair of side arms having peripheral edges defining first and second cutouts extending circumferentially between said arms;

first and second thrust reverser doors pivotally mounted to said side arms to cover said cutouts when stowed closed pivotally forward, and to uncover said cutouts when deployed open pivotally aft;

each of said doors extending continuously aft between axially opposite leading and trailing edges and terminating aft with said side arms in a planar exhaust exit when said doors are stowed closed; and each of said doors further including an inner flow deflector having peripheral edges adjoining said peripheral edges of said cutouts when stowed closed to define with said jet pipe and side arms a substantially continuous exhaust nozzle having a substantially uniform internal flow surface terminating aft at said planar exit.

23. A thrust reverser according to claim 22 wherein:

said cutout peripheral edges include a circumferential edge bridging said side arms, and corresponding longitudinal edges extending axially aft from said circumferential edge along said side arms; and said deflector peripheral edges include a circumferential leading edge correspondingly mating with said cutout circumferential edge, and corresponding lateral edges extending axially aft from said leading edge to correspondingly mate with said cutout longitudinal edges to provide said continuous exhaust nozzle interrupted solely by mating of said deflectors in said cutouts when said doors are stowed closed.

24. A thrust reverser according to claim 23 further comprising a peripheral seal adjoining said peripheral edges of said cutouts and said deflectors around said cutouts when said doors are stowed closed.

25. A thrust reverser according to claim 24 wherein said doors are pivotally mounted to said side arms to asymmetrically overlap said doors along said trailing edges thereof when deployed open.

26. A thrust reverser according to claim 24 wherein said cutout longitudinal edges terminate aft in corresponding arcuate edges at a planar aft end of said side arms to conform said peripheral seal with said deflectors when said doors are stowed closed from being deployed open.

* * * * *